United States Patent [19]

McDonogh et al.

[11] Patent Number: 5,385,670
[45] Date of Patent: Jan. 31, 1995

[54] METHOD FOR DRYING POROUS ULTRAFILTRATION MEMBRANES

[75] Inventors: Richard M. McDonogh, Stuttgart; Hermann J. Gohl, Bisingen-Zimmern; Reinhold J. Buck, Alleshausen, all of Germany

[73] Assignee: Gambro Dialysatoren GmbH & Co. KG, Germany

[21] Appl. No.: 60,021

[22] Filed: May 10, 1993

[30] Foreign Application Priority Data

Jun. 23, 1992 [DE] Germany .............................. 4220441

[51] Int. Cl.⁶ .............................................. B01D 39/00
[52] U.S. Cl. ............................ 210/500.3; 210/500.41; 210/500.27; 264/48
[58] Field of Search ............ 210/649, 636, 637, 500.37, 210/500.38, 490, 500.27, 500.23, 490, 500.41; 264/41, 48, 45.1, 343, 500.38, 500.41

[56] References Cited

U.S. PATENT DOCUMENTS

| | | | |
|---|---|---|---|
| 4,384,047 | 5/1983 | Benzinger et al. | 264/41 |
| 4,704,130 | 11/1987 | Gilding et al. | 264/48 |
| 4,818,387 | 4/1989 | Ikeda et al. | 210/490 |
| 4,867,934 | 9/1989 | Repetti et al. | 210/500.38 |
| 5,032,331 | 7/1991 | Onishi et al. | 264/48 |
| 5,181,490 | 1/1993 | Bikson et al. | 264/41 |
| 5,215,662 | 6/1993 | Johnson et al. | 210/500.38 |

*Primary Examiner*—Robert A. Dawson
*Assistant Examiner*—Ana M. Fortuna
*Attorney, Agent, or Firm*—Lerner, David, Littenberg, Krumholz & Mentlik

[57] ABSTRACT

A method for drying porous ultrafiltration membranes by the use of heat and possibly also at reduced pressure is characterized in that prior to the application of heat the pores of the membranes are at least partially filled with a solution of a water-soluble organic solid which swells the membranes and which has a melting point above 35° C. in an organic solvent which is completely miscible with water and which does not change the membrane structure.

20 Claims, No Drawings

METHOD FOR DRYING POROUS ULTRAFILTRATION MEMBRANES

Ultrafiltration membranes are usually made by precipitation or by way of a phase inversion method in an aqueous medium. As a result, porous membranes are produced, the pores of which are filled with water. To store them, or to further process the membranes into a modulus it is usually necessary or desirable to have them available in a dry state. In such a state, the membranes can be handled and further processed much more easily.

Customary drying methods which use heat and which also may be at reduced pressure often result in undesirable marked changes in pore structure and consequently in the filtration properties. With membranes made of low hydrophillic materials, or materials which are hydrophobic to varying degrees, it happens that after drying they can only be moistened again with difficulty by contacting them with water, and so expensive multi-stage methods are needed to do this which employ different solvents.

In the past, attempts have been made to solve these problems by penetrating water into the pores of the membrane by the use of glycerin. However, this method was problematic in that membranes containing glycerine can only be processed with difficulty, and in that large quantities of glycerin (ca. 30 to 40 g/m$^2$) have to be used, and in that the polymer forming the membrane absorbs the glycerin which makes it difficult to remove it later from the membrane through washing.

The aim of the invention is therefore to obtain a method for drying ultrafiltration membranes which overcomes the afore-mentioned problems of the prior art and which does not cause any change to the membrane properties through the use of heat for drying and/or which facilitates re-moistening with water or aqueous solutions after drying.

The method according to the invention for drying porous ultrafiltration membranes by the use of heat and possibly also at reduced pressure is characterised in that prior to the application of heat the pores of the membranes are Filled at least partially with a solution of a water soluble organic solid which swells the membranes and which has a melting point of above 35° within an organic solvent which is completely miscible with water and which does not change the structure of the membranes.

In practice, the procedure is such that the moist membrane produced is placed in the afore-mentioned solution and is allowed to Fully absorb the solution. Several hours are usually needed for this to happen. By way of example, to saturate the pores of the membrane with a solution of ascorbic acid in ethanol, four hours are needed.

After the membrane has fully absorbed the solution, the membrane is dried by increasing the temperature, wherein reduced pressure may be used to assist the drying process. When the membrane is drying, the organic solid crystallises in the pores or is precipitated in them. However, owing to the fact that it is water soluble it can easily be washed out of the pores later with water.

Surprisingly, by applying the afore-mentioned solution according to the invention before heating the membrane, the membrane keeps its original properties prior to drying, in particular its permeability and pore size distribution. In addition, by virtue of the method according to the invention, the membrane is easily, quickly and completely wettable again in water, even if the membrane is one consisting of hydrophobic materials.

This technical effect is due to a synergistic effect of the combination of the dissolved organic solid and the organic solvent, since only the combination of both during the drying process preserves the membrane properties. Neither the organic solvent alone nor the organic solid in aqueous solution is in a position to do this, but in both cases the pore properties of the membrane are significantly changed by the drying process.

The solution used according to the invention prior to the drying process can easily diffuse into the membrane pores. Preferably, the water soluble organic solid used is low-molecular and expediently has a molecular weight within the range of 100 and 500. The organic solids used are not easily absorbed in the polymer matrix in contrast to organic liquids such as glycerin which are absorbed to a considerable extent by the membrane polymer, and are therefore not easy to remove with re-wetting.

The organic solids used display their reciprocal action with the polymer matrix without binding large quantities of water and thus retaining it. The swelling of the polymer opens the physical structure of the polymer network, so that the molecules of the organic solid used are better able to penetrate. Expediently, with the method according to the invention, the pores of the membrane are completely filled with the afore-mentioned solution.

It is favourable if the water soluble organic solid used in the organic solvent is one of limited solubility and which is in high concentration and if possible a saturated solution, so that during the drying process the solid is able to precipitate as quickly as possible in the pores of the membrane. In this way, growth of large crystals is prevented.

The water soluble organic solids used are expediently organic acids or alkali metal salts thereof, particularly sodium- or potassium salts. Expedient examples of these are ascorbic acid, citric acid and the alkali metal salts thereof, such as sodium ascorbate, sodium citrate, sodium dihydrogen citrate or disodium hydrogen citrate. Another useable organic acid is sorbic acid, and the alkali metal salts thereof are also able to be used.

Another organic solid which can be used preferably according to the invention is polyvinyl pyrrolidone (PVP) which can, for example, expediently be used in conjunction with polyether sulphone- polyetherimide- or polyamide-membranes.

The organic solid used according to the invention should not melt in the pores of the membrane during the drying process, but should remain in a solid state. The solid is therefore selected in accordance with its melting point in dependency on the drying temperature used. Since, during the drying process, a temperature of at least 35° C. should be used, according to the invention the solid must have a melting point which is above this temperature. Preferably, the melting point of the solid is above 40° C., since the drying temperatures are often 40° C. or above.

The organic solvent used according to the invention is expediently selected in such a way that the organic solid used in this solvent is not of unlimited solubility, but has a solubility limit, which promotes Fast precipitation in the pores during the drying process. The organic solvents which are preferably used are low-molecular alcohols such as methanol or ethanol, particularly ethanol.

The use of lactic acids, and their salts and derivatives in alcohol is outside the scope of the invention.

The method according to the invention can be used by itself for drying any ultrafiltration membranes. The method is particularly suitable for membranes composed of polyethersulphone, polyetherimide, polysulphone or polyamide, each of which may be mixed with polyvinyl pyrrolidone.

The invention will be described hereinafter with the aid of the following examples.

EXAMPLE 1

Solutions of citric acid in ethanol were used having the concentrations disclosed in Table 1 hereinafter, for the purpose of steeping the polyethersulphone membranes for the steeping times shown in Table 1. The membranes were then dried at 40° C. for the drying times disclosed in Table 1.

The water permeability of the dried membranes was calculated at 0.2 bar before and after drying. The two values were used to calculate the retention of the properties in %. In this connection, it should be noted that the permeability increased particularly with long drying times.

The drying times were selected so that they were very long, so that complete drying was ensured. In practice, shorter drying times can be used.

TABLE 1

| Citric Acid Concentration (% weight in ethanol) | Steeping Time (h) | Drying Time at 40° C. (h) | Water Permeability (ml/mm $Hg \cdot h \cdot m^2$) before drying | after drying | Retention % |
|---|---|---|---|---|---|
| 35 | 5 | 11 | 250 | 215 | 86 |
| 35 | 5 | 11 | 80 | 61 | 77 |
| 35 | 5 | 11 | 902 | 902 | 100 |
| 35 | 5 | 11 | 81 | 82 | 101 |
| 35 | 7 | 15 | 137 | 261 | 191 |
| 35 | 7 | 15 | 65 | 94 | 144 |
| 20 | 4 | 10 | 1350 | 1200 | 89 |

EXAMPLE 2

In this example, a saturated solution of ascorbic acid in ethanol (concentration 5.2%) was used to steep the polyethersulphone membranes. Table 2 shows the steeping times and the drying times. Drying was at 40° C. and at atmospheric pressure, as in Example 1. The water permeability was noted before and after drying, and the retention of the properties calculated, as in Example 1. Table shows that with all the samples at least 100% retention of permeability was obtained.

TABLE 2

| Steeping Time (h) | Drying Time at 40° C. (h) | Water Permeability (ml/mm $Hg \cdot h \cdot m^2$) before drying | after drying | Retention % |
|---|---|---|---|---|
| 4 | 21 | 1273 | 1734 | 136 |
| 4 | 21 | 2361 | 3634 | 156 |
| 4 | 10 | 1320 | 1600 | 126 |
| 2 | 10 | 260 | 364 | 140 |
| 2 | 10 | 150 | 158 | 106 |
| 2 | 10 | 627 | 694 | 111 |
| 2 | 10 | 408 | 542 | 133 |
| 2 | 10 | 727 | 819 | 113 |
| 2 | 10 | 632 | 1030 | 163 |

We claim:

1. A method for drying a wet porous ultrafiltration membrane comprising the steps of: providing a wet ultrafiltration membrane, said ultrafiltration membrane including pores;
   at least partially filling said pores of said ultrafiltration membrane with a solution of a water soluble organic solid in an organic solvent; and
   drying said porous ultrafiltration membrane while at least a portion of said solution of said organic solid in said organic solvent remains within said pores of said membrane.

2. The method of claim 1, wherein said organic solid is a low molecular weight organic solid.

3. The method of claim 2, wherein said organic solid has a molecular weight in the range of between about 100 and about 500.

4. The method of claim 1, wherein said solution of said organic solid is substantially saturated 5. The method of claim 1, wherein said pores of said membrane are filled substantially completely with said solution.

6. The method of claim 5, wherein said pores of said membrane are saturated with said solution.

7. The method of claim 1, wherein said organic solid is selected from the group consisting of an organic acid and an alkali metal salt thereof.

8. The method of claim 7, wherein said organic solid is selected from the group consisting of ascorbic acid, citric acid, sorbic acid and alkali metal salts thereof.

9. The method of claim 1, wherein said organic solid is polyvinyl pyrrolidone.

10. The method of claim 1, wherein said organic solvent is a low molecular weight alcohol.

11. The method of claim 10, wherein said organic solvent is selected from the group consisting of ethanol and methanol.

12. The method of claim 1, wherein said ultrafiltration membrane is made of polyether sulphone, polyether imide, polysulphone or polyamide.

13. The method of claim 12, wherein said ultrafiltration membrane is made using an admixture comprising polyvinyl pyrrolidone.

14. The method of claim 1, wherein said organic solvent is completely miscible with water.

15. The method of claim 1, wherein said soluble organic solid has a melting point above 35° C.

16. The method of claim 15, wherein said organic solid has a melting point above 40° C.

17. The method of claim 1, wherein said drying step is accomplished under reduced pressure.

18. The method of claim 1, wherein at least a portion of said organic solid remains in said pores upon drying.

19. A method for drying a wet porous ultrafiltration membrane comprising the steps of: providing a wet porous ultrafiltration membrane composed of at least one material selected from the group consisting of polyether sulphone, polyether imide, polysulphone, polyamide and polyvinyl pyrrolidone, said ultrafiltration membrane including pores; filling, at least partially, said pores of said ultrafiltration membrane with a water miscible solution of a water soluble inorganic solid having a melting point about 35° C. dissolved in an organic solvent which is completely miscible with water and which has a molecular weight in the range of between about 100 and about 500; and drying said membrane; wherein at least a portion of said organic solid remains in said pores upon drying.

20. An ultrafiltration membrane produced in accordance with the method of claim 19.

* * * * *

UNITED STATES PATENT AND TRADEMARK OFFICE
CERTIFICATE OF CORRECTION

PATENT NO. : 5,385,670
DATED : January 31, 1995
INVENTOR(S) : McDonogh et al.

It is certified that error appears in the above-identified patent and that said Letters Patent is hereby corrected as shown below:

Column 1, line 44, "Filled" should read --filled--.

Column 1, line 52, "Fully" should read --fully--.

Column 2, line 67, "Fast" should read --fast--.

Column 3, line 52, "Table shows" should read --Table 2 shows--.

Signed and Sealed this

Twenty-fifth Day of July, 1995

Attest:

BRUCE LEHMAN

*Attesting Officer*     *Commissioner of Patents and Trademarks*